United States Patent [19]
Hogan

[11] Patent Number: 6,101,158
[45] Date of Patent: Aug. 8, 2000

[54] APPARATUS AND METHOD FOR REDUCING PHASE DISCONTINUITY BETWEEN NEW DATA AND PREVIOUSLY WRITTEN DATA ON A READ/WRITE OPTICAL STORAGE MEDIUM

[75] Inventor: Josh N. Hogan, Los Altos, Calif.

[73] Assignee: Hewlett-Packard Company, Palo Alto, Calif.

[21] Appl. No.: 09/130,024

[22] Filed: Aug. 6, 1998

[51] Int. Cl.[7] ....................................................... G11B 5/09
[52] U.S. Cl. ........................................ 369/47; 369/124.14
[58] Field of Search .................................. 369/47, 48, 49, 369/54, 50, 124.14; 360/26, 27, 31

[56] References Cited

U.S. PATENT DOCUMENTS

5,450,381  9/1995  Tsukamura et al. .................. 369/47 X
5,703,853  12/1997  Horigome et al. ....................... 369/48
5,963,518  10/1999  Kobayashi et al. ............ 369/124.14 X

*Primary Examiner*—Paul W. Huber

[57] ABSTRACT

An optical storage device includes a laser, a write clock generator and a read/write disc. The laser is modulated, and a readback signal is generated from laser light read back from the disc. The readback signal includes a first frequency component caused by the modulation of the laser and a second frequency component caused by information (e.g., data or a high frequency wobble) on the medium. Phase of the write clock is adjusted in accordance with a phase difference between the first and second frequency components. This adjustment allows new data to be written to the read/write disc without a phase discontinuity between the new data and data previously written to the disc.

20 Claims, 5 Drawing Sheets

APPARATUS AND METHOD FOR REDUCING PHASE DISCONTINUITY BETWEEN NEW DATA AND PREVIOUSLY WRITTEN DATA ON A READ/WRITE OPTICAL STORAGE MEDIUM

BACKGROUND OF THE INVENTION

The invention relates to optical data storage devices. More specifically, the invention relates to an apparatus and method for writing data to an optical storage medium such as a digital video disc or compact disc.

An optical storage disc can store large amounts of data. A single compact disc ("CD") can store more than 500 megabytes of data, and a single Digital Video Disc ("DVD") following a DVD Rewritable ("DVD+RW") format can store more than 3 gigabytes of data. A record album could be stored on the CD; a full-length movie (compressed) could be stored on the DVD.

"Read/write" drives can write new data to "read/write" discs. Read/write discs include optical discs that allow new data to be written only once and optical discs that allow new data to be written many times. A DVD+RW disc is an example of a read/write disc that allows new data to be written many times.

A read/write drive typically has a read mode of operation and at least one of the following write modes of operation: a write-append mode and an insert-edit mode. The write-append mode allows new data to be appended to previously written data on the read/write disc, and the insert-edit mode allows previously written data to be overwritten with new data.

When writing new data to a read/write disc, it is not desirable to create a frequency or phase discontinuity between the previously written data and the new data. The read/write drive might not be able to tolerate such discontinuities during read back of the previously written data and the new data. During readback, the discontinuities might cause problems for clocks and data recovery circuitry. Consequently, the phase discontinuities might render portions of the read/write disc effectively unreadable by the read/write drive.

This phase discontinuity problem is typically overcome by the use of "edit gaps" (also known as a "splice areas"). New data is written to a read/write disc in blocks that are separated by the edit gaps. The edit gaps allow sufficient time for the clocks and data recovery circuitry to recover from a phase discontinuity before data is read from the next block.

However, the use of edit gaps has its drawbacks. Storage capacity of the read/write disc is reduced because data is not stored in the edit gaps.

Moreover, the edit gaps might render portions of the read/write disc unreadable by existing read-only drives. Older read-only drives that were developed prior to newer generation read/write drives may not be capable of processing edit gaps. Unless an existing read-only drive is somehow modified to navigate past the edit gaps, it will have difficulty reading the data stored on the read/write disc.

A need exists for reducing phase discontinuity between the new data and previously written data without the use of edit gaps.

SUMMARY OF THE INVENTION

The present invention reduces phase discontinuity between previously written data and new data on a read/write optical storage medium without the use of edit gaps. In an optical storage device including a laser, the laser is modulated, and a readback signal is generated from laser light returned by an optical storage medium within the device. The readback signal includes a first component caused by the modulation of the laser and a second component caused by information on the medium. Phase of a write clock in the optical storage device is adjusted in accordance with a phase difference between the first and second components. This adjustment allows new data to be written to the read/write medium without a phase discontinuity between the new data and the previously written data.

Other aspects and advantages of the present invention will become apparent from the following detailed description, taken in conjunction with the accompanying drawings, illustrating by way of example the principles of the invention.

DETAILED DESCRIPTION OF THE INVENTION

As shown in the drawings for purposes of illustration, the present invention is embodied in a read/write drive. The read/write drive is capable of reducing phase discontinuities between data to be written to a read/write medium and data previously written to the read/write medium. Consequently, the read/write drive can write new data to a read/write medium without the use of edit gaps. Because the edit gaps are not used, storage capacity of the read/write medium is increased. Additionally, the read/write medium is compatible with existing read-only drives.

In the paragraphs that follow, the read/write drive will be described as a DVD read/write drive and the read/write medium will be described as a DVD read/write disc. First, a description of the DVD read/write disc will be provided. Then a description of the DVD read/write drive will be provided.

Figure 1:
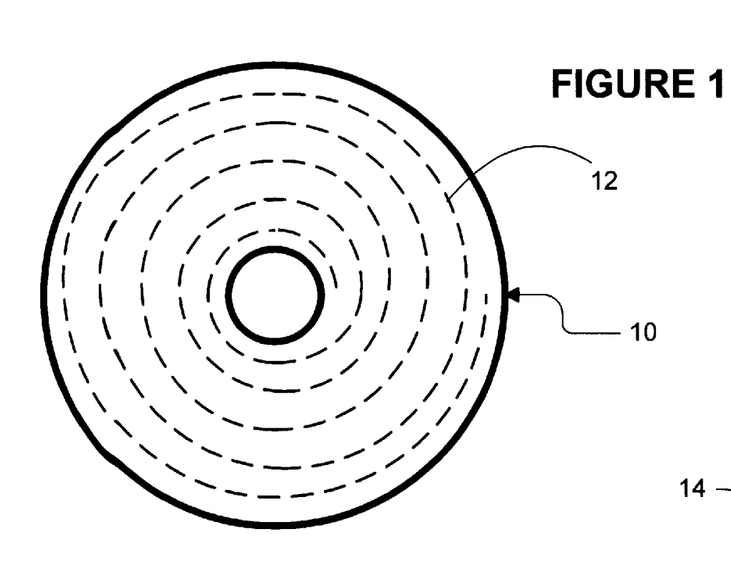
FIG. 1 is an illustration of a read/write disc.
Figure 2:
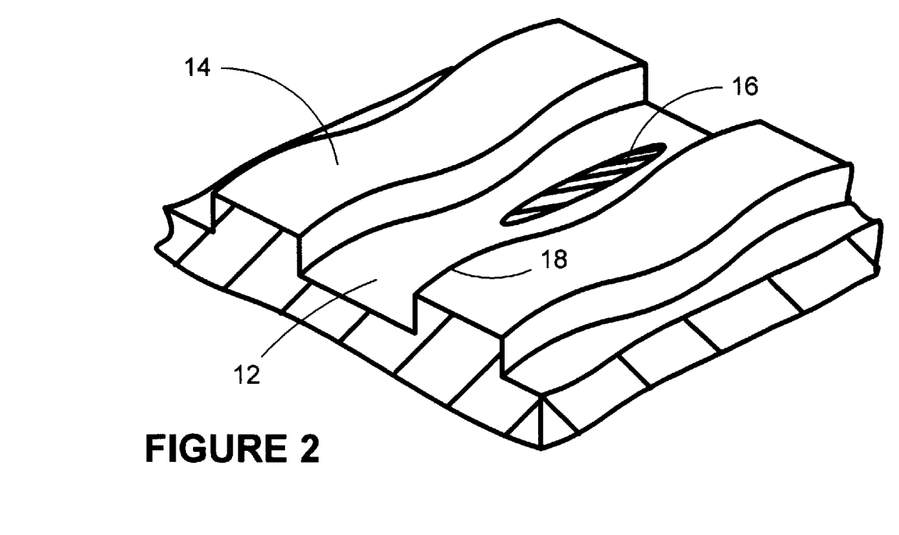
FIG. 2 is an illustration of a cross-section of the read/write disc.

FIGS. 1 and 2 show a phase-change DVD disc 10, hereinafter referred to as the disc 10. The disc 10 includes a rigid substrate that is coated with a recordable medium. The recordable medium may be made of a read/write material such as a phase change material. A spiral groove 12 is embedded in the disc 10. A laser beam can be used to heat and cool the recordable medium quickly to form marks 16 having an amorphous state. The laser beam can also be used to erase the marks 16 from the recordable medium by annealing the marks 16 into a soft, crystalline state. Data is represented by patterns of marks 16 on the disc 10.

The spiral groove 12 may have a high frequency wobble 18. The high frequency wobble 18 gives the spiral groove 12 a slight sinusoidal wave. The high frequency wobble 18 may be modulated at a high frequency as described below to reduce phase discontinuity between new data and previously written data. The high frequency wobble 18 may be further modulated at a low frequency to obtain addressing information.

FIGS. 1 and 2 merely provide illustrations that facilitate an understanding of the invention; they are not intended to show the disc 10 in detail or to scale. The number of spirals in the groove 12, the depth and thickness of the groove 12, the amplitude and frequency of the wobble 18, the size and thickness of the marks 16, etc., are not illustrated to scale.

Figure 3:
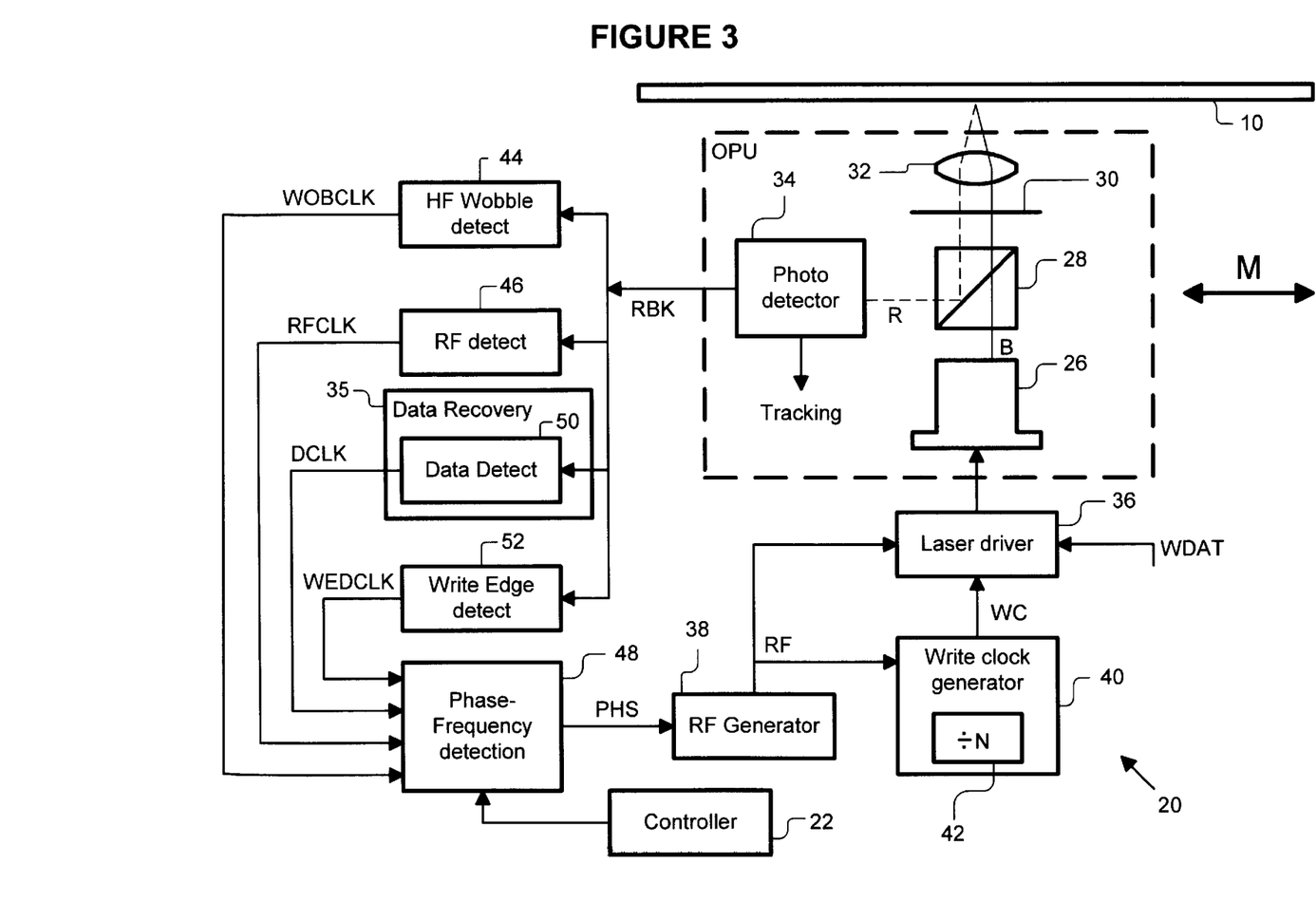
FIG. 3 is a block diagram of a read/write drive according to the present invention.

FIG. 3 shows the disc 10 and a DVD drive 20 that follows a DVD format specification such as the DVD+RW format specification. The DVD drive 20 includes a controller 22 for receiving a mode of operation from a host (e.g., a personal computer). The modes of operation include a read mode and may include various write modes such as a write-append mode and an insert-edit mode. The controller 22 also, among other things, receives addressing information from the host.

The DVD drive 20 further includes an optical pickup unit 24 and a tracking servo (not shown) for moving the optical pickup unit 24 along a radial direction of the disc 10. The radial direction is indicated by the arrow M. The optical pickup unit 24 and the tracking servo can have a conventional construction.

The optical pickup unit 24 includes a diode laser 26, optics 28, 30 and 32, and a photodetector 34. The diode laser 26 emits a beam B of light having a specific wavelength (in present generation DVD drives, the diode laser has a wavelength of about 650 nanometers).

A linearly polarized laser beam B generated by the diode laser 26 is transmitted by a beamsplitter 28 and circularly polarized by a quarter wave plate 30, ninety degrees out of phase. A lens 32 focuses the circularly polarized laser beam B onto the disc 10.

The laser beam B is reflected differently by the non-amorphous marks 16 and the crystalline spaces on the disc 10. Reflected light R (shown in dashed lines) is polarized by the quarter wave plate 30. Linearly polarized light leaving the quarter wave plate 30, now 180 degrees out of phase, is reflected by the beamsplitter 28 towards the photodetector 34.

The photodetector 34 detects the reflected beam R in a conventional manner. Typically, four quadrants of detector elements generate signals in response to light impinging the photodetector 34. The signals from the four quadrants are summed together to form a readback signal RBK, which carries the data that is read from the disc 10.

A conventional data recovery circuit 35 recovers data from the readback signal RBK. The recovered data is sent to conventional circuitry (not shown) for demodulating the recovered data, arranging the demodulated data in error correction code ("ECC") blocks, and performing error correction on the ECC blocks. The error-corrected data is sent to the host.

Conventional circuitry (not shown) also processes the detector element signals to derive a tracking signal and addressing information for the tracking servo. A spindle motor (not shown) is also included for rotating the disc 10.

Figure 5:
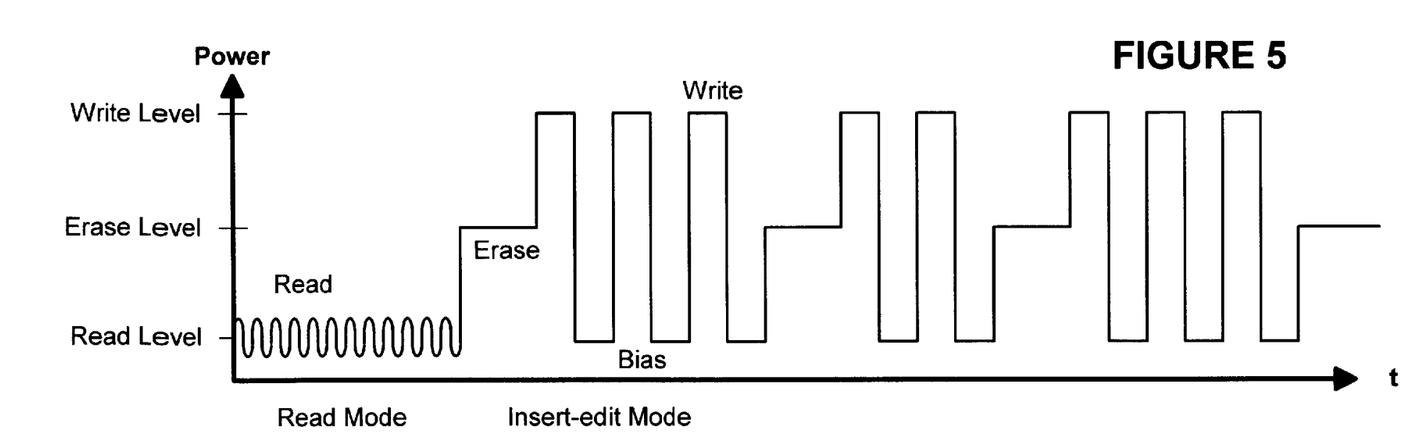
FIG. 5 is an illustration of laser power within the read/write drive before and during an insert-edit operation.

The diode laser 26 is driven by a laser driver 36. The laser driver 36 supplies appropriate power to the diode laser 26. Power of the laser beam B depends upon the mode of operation of the DVD drive 20. The laser power will be controlled between various levels including a read level for reading data from the disc 10, an erase level for erasing data on the disc 10, and a write level for writing data to the disc 10 (the various levels are illustrated in FIG. 5).

During read mode, the disc 10 is rotated by the spindle motor and a high frequency RF generator 38 generates a modulation signal RF, a clock that causes the laser driver 36 to modulate the diode laser 26 at an RF frequency. The diode laser 26 is modulated at the RF frequency primarily to address a laser noise issue. The relationship between the RF frequency and the optical path length is appropriately chosen to suppress noise. The RF frequency is typically much higher than the highest frequency of data stored on the disc 10 (i.e., the channel bit clock frequency) so as not to interfere with data recovery. If, for example, the read/write drive 20 has a channel bit clock frequency of 26 MHz, the frequency of the modulation signal RF might be 26 MHz× 16=416 MHz. The RF generator 38 may include a voltage-controlled oscillator that oscillates at a nominal frequency (e.g., 416 MHz). The phase and frequency of the RF modulation is controlled by an external signal.

Write operations are performed by supplying a data signal WDAT and a write clock WC to the laser driver 36. Before data is written to the disc 10, however, the data is ECC-encoded and modulation-encoded. The data signal WDAT can be generated by conventional circuitry (not shown).

A write clock generator 40 derives the write clock WC from the modulation signal RF. The write clock generator 40 includes a frequency divider 42 that receives the modulation signal RF from the RF generator 38 and outputs the write clock WC at a lower frequency. For example, a frequency divider 42 having N=16 will reduce the 416 MHz frequency to a write clock frequency of 26 MHz, which also happens to be the channel bit frequency. Thus, the write clock WC is phase and frequency locked to the modulation signal RF generated by the RF generator 38. Phase of the write clock WC is adjusted by adjusting the phase of the modulation signal RF.

The phase of the write clock WC is adjusted at the beginning of a write-append operation by using high frequency information provided by the disc 10 and high frequency information provided by the laser beam B. The disc-based frequency information may be provided by the high frequency wobble 18. Prior to the write-append operation (that is, during a read operation), the laser beam B is modulated by the wobble 18 in the spiral groove 12, and the reflected beam R is detected by the photodetector 34. Thus, the readback signal RBK contains a high frequency component caused by the wobble 18. A wobble detection circuit 44 performs clock recovery to derive a wobble clock WOB-CLK from the readback signal RBK (clock recovery in general and a circuit 100 for performing the clock recovery are described below in connection with FIGS. 7 and 8). The wobble clock WOBCLK has a frequency equal to the frequency of the high frequency 20 wobble and is phase-locked with edges in the wobble-induced frequency component of the readback signal RBK.

The beam-based frequency information may be provided by the RF laser modulation. The readback signal RBK contains a high frequency component caused by the RF modulation of the laser beam B. An RF detection circuit 46 performs clock recovery to derive a modulation clock RFCLK from the readback signal RBK. The modulation clock RFCLK has a frequency equal to the RF clock frequency and is phase-locked with edges in the laser modulation-induced frequency component of the readback signal RBK.

A phase-frequency detection circuit 48 determines a phase difference between the wobble clock WOBCLK and the modulation clock RFCLK, and generates a control signal PHS that adjusts the phase of the modulation signal RF according to the phase difference. This, in turn, adjusts the phase of the write clocks WC. Consequently, new data can be appended to the disc 10 without a phase discontinuity between the previously written data and the new data.

The phase of the write clock WC can be adjusted by the full amount of the phase difference or by a fraction of the phase difference. A fraction of the phase difference might be used to compensate for timing delays. For example, timing delays might be caused by an undefined timing path difference between the timing circuitry that generates the laser modulation for writing and the circuitry that derives the clock derived from the information on the disc 10.

In certain situations, the high frequency wobble information might not be available. A read/write medium such as a write-once disk might not have the high frequency wobble 18. If the high frequency wobble information is not available, high frequency information may be derived instead from the data stored on the disc 10. A data detection circuit 50, which is included in the data recovery circuit 35, derives a data clock DCLK from the readback signal RBK The data clock DCLK has a frequency equal to the channel bit frequency and is phase-locked with edges of the data in the readback signal RBK. The data clock DCLK is supplied to the phase-frequency detection circuit 48, which adjusts the write clock phase according to a phase difference between the data clock DCLK and the modulation clock RFCLK.

Thus, problems with phase discontinuity are overcome by exploiting the fact that the diode laser 26 is modulated at a high frequency during read mode. Phase locking the modulation clock RFCLK with the wobble clock WOBCLK (or the data clock DCLK) provides the opportunity to determine the phase offset between the clock that will be used for writing (the write clock WC) and the clock derived from information already on the disc 10. The phase relation between the modulation clock RFCLK and the wobble clock WOBCLK (or the data clock DCLK) provides an accurate measure of the relation between the write clock WC and the previously written data at the beginning of a write-append operation.

Determining the phase difference during the write-append mode is performed differently than determining the phase difference during the insert-edit mode. An exemplary read operation followed by an insert-edit operation is illustrated FIGS. 4, 5 and 6. During the read operation, laser power is modulated at about the read level. During the insert-edit operation, laser power is increased to about the erase level to erase previously written data OLD, and laser power is pulsed between the write level and the bias level to write new data NEW to the disc 10 (the previously written data OLD is shown in dashed lines and the new data NEW is shown in solid lines).

Figure 4:
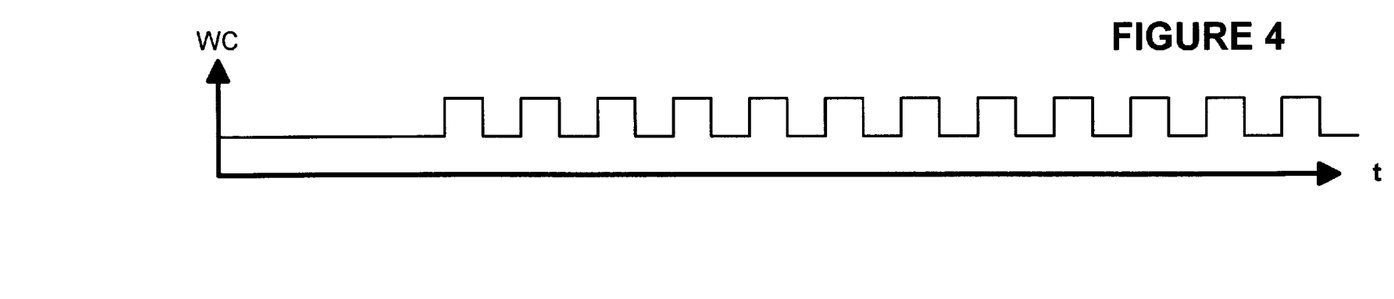
FIG. 4 is a timing diagram of a write clock generated within the read/write drive.
Figure 6:
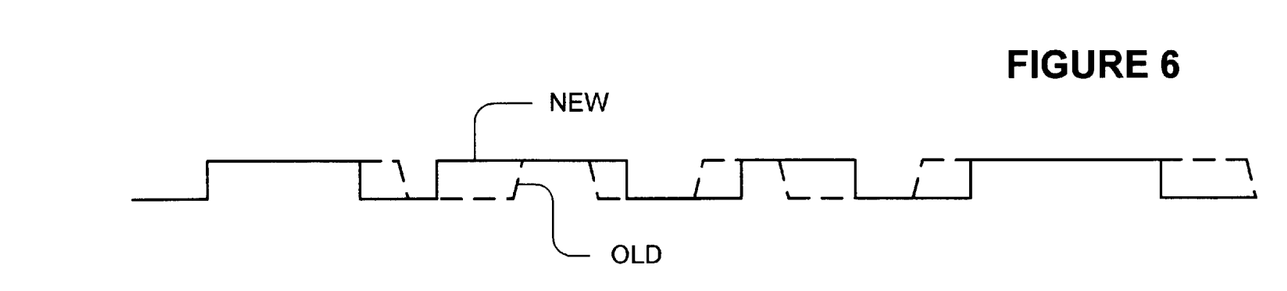
FIG. 6 is an illustration of data written to the read/write disc during the insert-edit operation of FIG. 5.

Prior to beginning the insert-edit operation, the phase difference between the wobble clock WOBCLK (or data clock DCLK) and the modulation clock RFCLK is determined. At the beginning of the insert-edit operation, the write clock phase is adjusted according to this phase difference.

During the insert-edit operation, however, the modulation clock RFCLK is not available for use by the phase-frequency detection circuit 48. The laser 26 is not typically modulated by the RF generator 38 during an insert-edit operation. Therefore, the phase of the write clock WC is adjusted during the insert-edit operation by using the wobble clock WOBCLK and a clock other than the modulation clock RFCLK.

Although the laser 26 is not modulated by the RF generator 38 during the insert-edit operation, it is modulated by the write clock generator 40. Consequently, high frequency information may be derived from the modulation of the laser 26 between the write and bias levels. A write edge detection circuit 52 performs clock recovery to derive a write edge clock WEDCLK from the readback signal RBK. The write edge clock WEDCLK has a frequency equal to the frequency of write edges WE in the laser beam B (see FIG. 5) and it is phase-locked with the write edges in the write edge-induced frequency component of the readback signal RBK. The phase-frequency detection circuit 48 determines a phase difference between the write edge clock WEDCLK and the wobble clock WOBCLK and uses the phase difference to adjust the phase of the RF generator 38.

Figure 7:
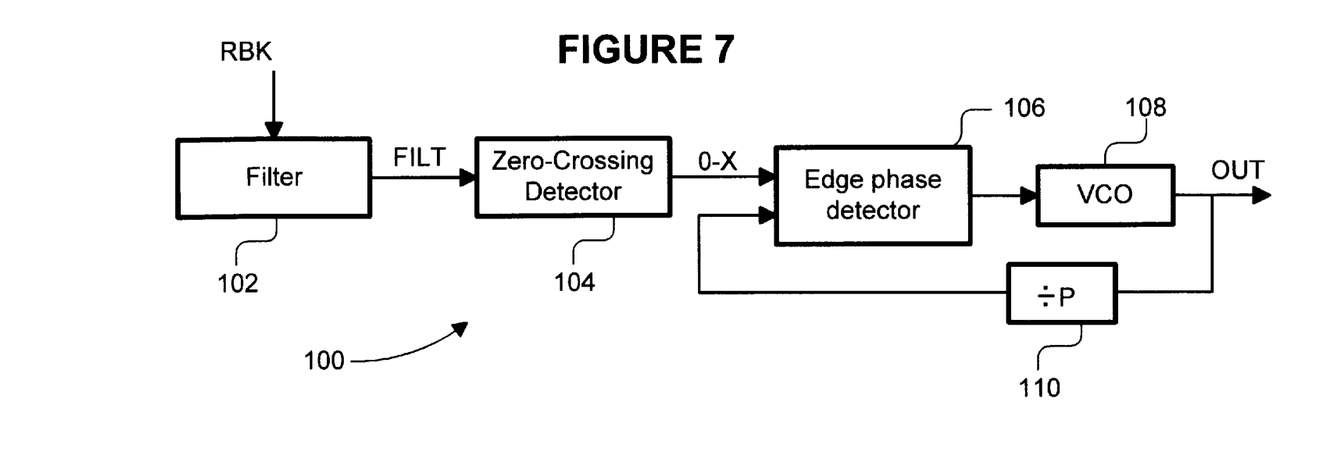
FIG. 7 is a block diagram of a clock recovery circuit that is used by the read/write drive.
Figure 8:
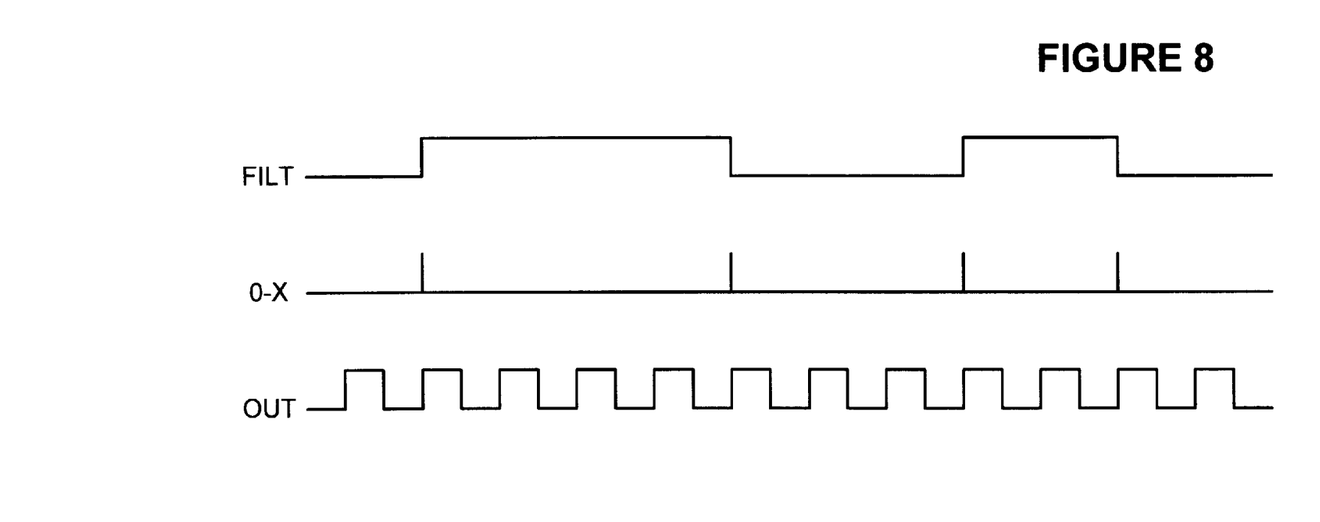
FIG. 8 is a timing diagram for the clock recovery circuit.

FIG. 7 shows a generic circuit 100 for performing clock recovery, and FIG. 8 shows a timing diagram for the clock recovery circuit 100. The clock recovery circuit 100 can be adapted for use in the wobble detection circuit 44, the RF detection circuit 46, the data detection circuit 50 and the write edge detection circuit 52.

A bandpass filter 102 passes a desired component of the readback signal RBK. The bandpass filter 102 of the wobble detection circuit 44 is centered about the frequency of the high frequency wobble 18. The bandpass filter of the RF detection circuit 46 is centered about the frequency of the modulation signal RF. The bandpass filter 102 of the data detection circuit 50 is centered about the channel bit frequency. The bandpass filter 102 of the write edge detection circuit 52 is centered about the frequency at which write edges occur during a write operation.

A zero-crossing detector 104 generates a signal 0-X having edges that correspond to edges in the signal FILT provided by the bandpass filter 102. A combination of an edge phase detector 106, voltage controlled oscillator 108 and divider 110 generate a VCO output signal OUT that is phase-locked to the edges in the signal 0-X provided by the zero-crossing detector 104.

An output of the voltage controlled oscillator 108 of the wobble detection circuit 44 provides the wobble clock WOBCLK. An output of the voltage controlled oscillator 108 of the RF detection circuit 46 provides the modulation clock RFCLK. An output of the voltage controlled oscillator 108 of the data detection circuit 50 provides the data clock DCLK. An output of the voltage controlled oscillator 108 of the write edge detection circuit 52 provides the write edge clock WEDCLK.

Figure 9:
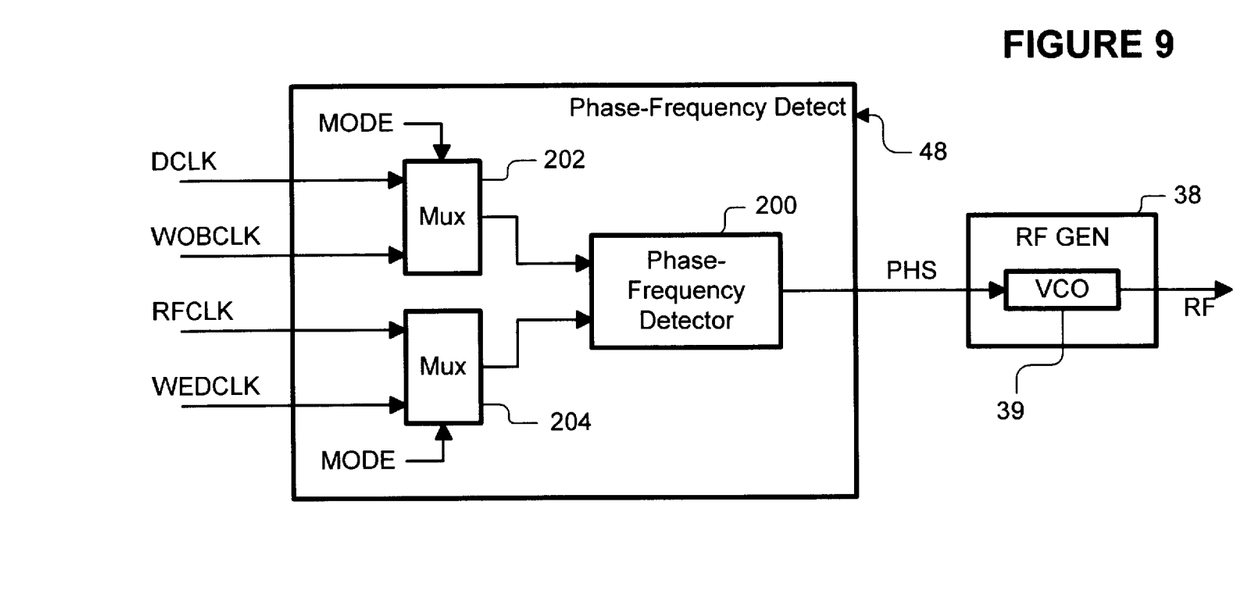
FIG. 9 is a block diagram of a phase detection circuit for the read/write drive.

FIG. 9 shows the phase-frequency detection circuit 48 in greater detail. A phase-frequency detector 200 detects phase and frequency differences between a signal on its first input and a signal on its second input. A phase-frequency detector 200 such as the Motorola MC4344 or MC4044 may be used.

A first multiplexer 202 supplies either the wobble clock WOBCLK or the data clock DCLK to the first input of the phase-frequency detector 200. A second multiplexer 204 supplies either the modulation clock RFCLK or the write edge clock WEDCLK to the second input of the phase-frequency detector 200. Selection by the multiplexers 202 and 204 is controlled by a select signal MODE, which is supplied by the controller 22 and based upon conditions such as the mode of operation of the DVD drive 20. For example, the first multiplexer 202 will supply the data wobble clock WOBCLK to the first input of the frequency-phase comparator 200 and the second multiplexer 204 will supply the write edge clock WEDCLK to the second input of the frequency-phase comparator during the insert-edit mode of operation.

An output of the phase-frequency detector 200 provides the control signal PHS that adjusts the phase of the modulation signal RF. The control signal PHS may be supplied directly to a voltage-controlled oscillator 39 of the RF generator 38.

Figure 10:
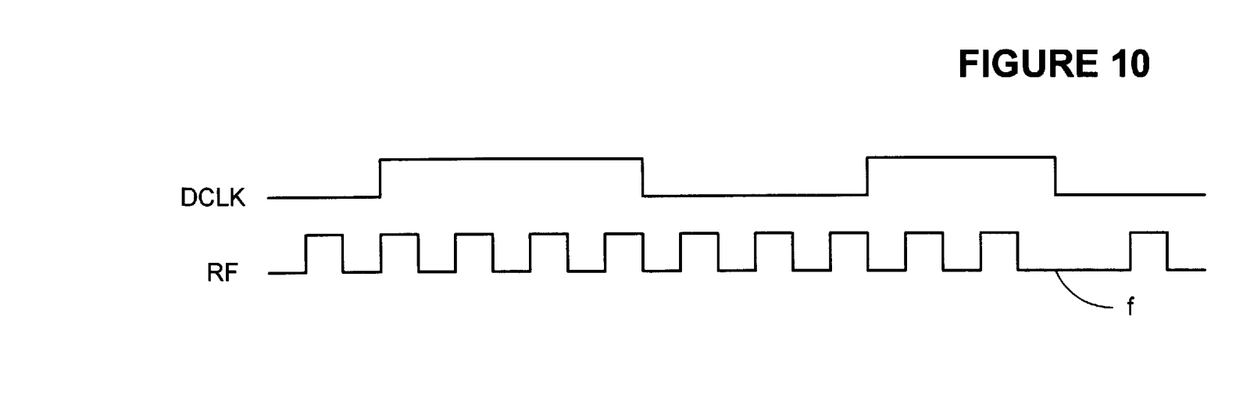
FIG. 10 is a timing diagram of cycle detection that is performed by the phase detection circuit.

Referring additionally to FIG. 10, the phase-frequency detection circuit 48 can also identify clock cycles of the modulation clock RFCLK if phase discontinuities are greater than +/− one-half of an RF clock period. The RF generator 38 could identify a cycle of the modulation clock RFCLK by imposing a fiduciary or index mark f in the modulation signal RF at preselected times. For example, every $64^{th}$ pulse of the RF signal could be deleted. The phase-frequency detection circuit 48 would then determine whether the index mark f coincides with an edge of the data clock DCLK or the wobble clock WOBCLK. If the index mark f does not coincide with an edge of the data clock DCLK or wobble clock WOBCLK, the phase-frequency detection circuit 48 would suspend the write operation (e.g., by turning off a write gate) and adjust the phase of the modulation signal RF until the fiduciary mark and the clock edge coincide.

Although the invention was described above in connection with a DVD drive 20, it is not so limited. The invention may be applied to CD recordable drives, magneto-optic drives and other read/write storage devices that include a write clock.

Moreover, the invention is not limited to the specific embodiments described and illustrated above. For example, the write clock may be generated by a device other than the RF generator (e.g., a standalone voltage-controlled oscillator). The disc-based information is not limited to clocks derived from data or high frequency wobble, and the laser-based information is not limited to clocks derived from RF modulation or write clock modulation of the laser 26. Clocks may be derived from other laser-based and disc-based sources that are available. Therefore, the invention is construed according to the claims that follow.

What is claimed is:

1. A method of adjusting phase of a write clock in an optical storage device, the optical storage device including a laser and a read/write optical medium, the method comprising the steps of:

modulating the laser;

generating a readback signal from laser light returned by the medium, the readback signal including a first component caused by the modulation of the laser and a second component caused by information on the medium; and adjusting the phase of the write clock according to a phase difference between the first and second components;

whereby adjusting the phase allows new data to be written to the medium without a phase discontinuity between the new data and previously written data.

2. The method of claim 1, further comprising the steps of using a modulation signal to modulate the laser during a read mode of operation; and deriving the write clock from the modulation signal; wherein the phase of the write clock is adjusted by adjusting the phase of the modulation signal.

3. The method of claim 1, wherein the phase of the write clock is adjusted by deriving first and second clock signals from the first and second components; detecting a phase difference between the first and second clock signals; and generating a control signal for adjusting the phase of the write clock by at least a fraction of the phase difference.

4. The method of claim 1, wherein the first component is caused by modulation of the laser during a read mode of operation, wherein the second component is caused by previously written data on the medium, and wherein the write clock is adjusted according to the phase difference between the first component caused by the laser modulation and the second component caused by the previously written data.

5. The method of claim 1, wherein the first component is caused by modulation of the laser during a read mode of operation, wherein the second component is caused by a high frequency wobble on the medium, and wherein the write clock is adjusted according to the phase difference between the first component caused by the laser modulation and the second component caused by the high frequency wobble.

6. The method of claim 1, wherein the first component is caused by modulation of the laser during a write mode of operation, wherein the second component is caused by a high frequency wobble on the medium, and wherein the write clock is adjusted according to the phase difference between the first component caused by the laser modulation and the second component caused by the high frequency wobble.

7. The method of claim 1, further comprising the steps of forming a fiduciary mark in a signal used for modulating the laser, the first component also having a fiduciary mark corresponding to the fiduciary mark in the signal used for modulating the laser; and adjusting the phase of the write clock until the fiduciary mark in the first component is aligned with an edge in the second component.

8. Apparatus comprising:

a laser driver;

an optical pickup unit including a laser coupled to the laser driver, an output of the optical pickup unit providing a readback signal;

a write clock generator for supplying a write clock to the laser driver during a write operation;

first means for deriving first and second signals from the readback signal, the first signal representing a first readback signal component caused by modulation of the laser, the second signal representing a second readback signal component caused by external modulation of the laser beam; and second means for adjusting the phase of the write clock according to a phase difference between the first and second signals.

9. The apparatus of claim 8, further comprising an RF generator for generating a modulation signal to modulate the laser during a read mode of operation; wherein the write clock generator derives the write clock from the modulation signal; and wherein the phase of the write clock is adjusted by adjusting the phase of the modulation signal.

10. The apparatus of claim 8, wherein the first means includes:

a first detection circuit for recovering a clock from a readback signal component caused by modulation of the laser during a read mode of operation, an output of the first detection circuit providing the first signal; and a second detection circuit for recovering a clock from a readback signal component caused by modulation of the laser by previously written data, an output of the second detection circuit providing the second signal.

11. The apparatus of claim 8, wherein the first means includes:

a first detection circuit for recovering a clock from a readback signal component caused by modulation of the laser during a read mode of operation, an output of the first detection circuit providing the first signal; and a second detection circuit for recovering a clock from a readback signal component caused by modulation of the laser by high frequency wobble, an output of the second detection circuit providing the second signal.

12. The apparatus of claim 8, wherein the first means includes:

a first detection circuit for recovering a clock from a readback signal component caused by modulation of the laser during a write mode of operation, an output of the first detection circuit providing the first signal; and a second detection circuit for recovering a clock from a readback signal component caused by modulation of the laser by high frequency wobble, an output of the second detection circuit providing the second signal.

13. The apparatus of claim 8, further comprising means for generating a laser modulation signal having fiduciary marks, the first signal having fiduciary marks corresponding to the fiduciary marks of the laser modulation signal; and wherein the second means further adjusts the write clock until the fiduciary mark in the first signal is aligned with an edge in the second signal.

14. Apparatus for adjusting write clock phase in a read/write optical storage device, the optical storage device including a laser and a photodetector for generating a readback signal, the apparatus comprising:

a first clock recovery circuit adapted to derive a first clock from a readback signal component caused by modulation of the laser;

a second clock recovery circuit adapted to derive a second clock from a readback signal component caused by external modulation of the laser; and a phase detector for detecting a phase difference between the first and second clocks, an output of the phase detector being used to adjust the write clock phase.

15. The apparatus of claim 14, further comprising an RF generator for generating a laser modulation signal during a read mode of the optical storage device; and a write clock generator for deriving a write clock from the laser modulation signal, the output of the phase detector being used to adjust phase of the laser modulation signal, whereby the phase of the write clock is also adjusted.

16. The apparatus of claim 15, wherein the RF generator imposes fiduciary marks in the laser modulation signal, the first clock having corresponding fiduciary marks; and wherein the phase detector further adjusts the write clock until the fiduciary mark in the first clock is aligned with an edge in the second clock.

17. The apparatus of claim 14, wherein the first clock recovery circuit is adapted to recover the first clock from a readback signal component caused by laser modulation during a read mode of the optical storage device.

18. The apparatus of claim 14, wherein the first clock recovery circuit is adapted to recover the first clock from a readback signal component caused by laser modulation during a write mode.

19. The apparatus of claim 14, wherein the second clock recovery circuit is adapted to recover the second clock from a readback signal component caused by modulation of the laser by high frequency wobble.

20. The apparatus of claim 14, wherein the second clock recovery circuit is adapted to recover the second clock from a readback signal component caused by modulation of the laser by previously written data.

* * * * *